United States Patent
Eliáš et al.

(10) Patent No.: US 9,391,902 B2
(45) Date of Patent: Jul. 12, 2016

(54) SYSTEM AND METHOD FOR DYNAMIC COLLABORATION DURING QUERY PROCESSING

(71) Applicant: Red Hat, Inc., Raleigh, NC (US)

(72) Inventors: Filip Eliáš, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 216 days.

(21) Appl. No.: 14/106,411

(22) Filed: Dec. 13, 2013

(65) Prior Publication Data

US 2015/0169685 A1    Jun. 18, 2015

(51) Int. Cl.
  *G06F 17/30* (2006.01)
  *H04L 12/803* (2013.01)

(52) U.S. Cl.
  CPC ........ *H04L 47/125* (2013.01); *G06F 17/30442* (2013.01); *G06F 17/30454* (2013.01); *G06F 17/30463* (2013.01); *G06F 17/30474* (2013.01)

(58) Field of Classification Search
  USPC .................................. 707/713, 718, 719, 720
  See application file for complete search history.

(56) References Cited

U.S. PATENT DOCUMENTS

| | | | |
|---|---|---|---|
| 7,058,622 B1 | 6/2006 | Tedesco | |
| 7,792,823 B2 | 9/2010 | Cain et al. | |
| 8,239,373 B2 | 8/2012 | Sthanikam et al. | |
| 8,489,580 B2 | 7/2013 | Kulkarni et al. | |
| 2006/0200438 A1 | 9/2006 | Schloming | |
| 2007/0226186 A1* | 9/2007 | Ewen | G06F 17/30463 |
| 2011/0010379 A1 | 1/2011 | Gilderman et al. | |
| 2011/0022583 A1* | 1/2011 | Pennell, Sr. | G06F 17/30463 707/718 |
| 2011/0313999 A1* | 12/2011 | Bruno | G06F 17/30463 707/718 |
| 2012/0203762 A1* | 8/2012 | Kakarlamudi | G06F 17/30463 707/718 |
| 2012/0271815 A1* | 10/2012 | Pennell, Sr. | G06F 17/30463 707/718 |
| 2012/0323885 A1* | 12/2012 | Wang | G06F 17/30448 707/714 |
| 2013/0262436 A1* | 10/2013 | Barsness | G06F 17/30463 707/718 |
| 2014/0101135 A1* | 4/2014 | Yousaf | G06F 17/30442 707/722 |

FOREIGN PATENT DOCUMENTS

KR    100258097 B1    6/2000

OTHER PUBLICATIONS

Deshpande, Amol et al., "Decoupled Query Optimization for Federated Database Systems," Proceedings of the 18th International Conference on Data Engineering (ICDE 2002), IEEE, 12 pages.
Deshpande, Amol et al., "Adaptive Query Processing," Foundations and Trends in Databases, vol. 1, No. 1 (2007), pp. 1-140.
Kementsietsidis, Anastasios et al., "Scalable Multi-Query Optimization for Exploratory Queries over Federated Scientific Databases," IBM T.J. Watson Research Center; Hasselt University and Transnational University of Limburg, 2008, 12 pages.

* cited by examiner

*Primary Examiner* — Cam-Linh Nguyen
(74) *Attorney, Agent, or Firm* — Haynes & Boone, LLP

(57) ABSTRACT

A system and method of dynamic collaboration during query processing includes determining a load factor for a data source, receiving a query at a query assistant running on a computer server, determining a complexity of the query, adjusting the complexity by the load factor, simplifying the query by removing one or more first query elements from the query when the adjusted complexity is above a threshold, forming a query plan where the first query elements are designated for processing outside the data source, and performing the query plan by sending one or more abbreviated queries to the data source and processing the first query elements using the query assistant. The abbreviated queries are based on the query with the first query elements removed. In some examples, the query may be iteratively simplified until a second adjusted complexity of a simplified version of the query falls below the threshold.

20 Claims, 6 Drawing Sheets

500

| ID | Query Element | Cost |
|---|---|---|
| 1 | Union | 1.2 |
| 2 | Group By | 1.3 |
| 3 | Order By | 1.5 |
| 4 | Inner Join | 1.3 |
| 5 | Right Join | 1.4 |
| 6 | Left Join | 1.4 |
| 7 | Full Join | 1.4 |
| 8 | Functions (avg, min, etc.) | 1.2 |
| 9 | Inequalities (>, <, >=, <=, etc.) | 1.2 |
| 10 | Equals | 1.2 |
| 11 | Like | 1.3 |
| 12 | Between | 1.3 |
| 13 | In | 1.2 |

SYSTEM AND METHOD FOR DYNAMIC
COLLABORATION DURING QUERY
PROCESSING

BACKGROUND

The present disclosure relates generally to computing systems, and more particularly to dynamic collaboration during query processing.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and provide computing services for each other. In order to do so, a server or some other computing system may provide an interface through which service requests are made by the other computing devices or clients. In these service-oriented architectures (SOAs), the clients generally make a service request by sending a request message to the server hosting a requested service and/or application using, for example, a networking protocol. The server receives the message, activates the requested service or application, and returns a response message with the result. For example, a very basic form of services is demonstrated by a request for a web page. A client, such as a web browser, sends a Hypertext Transport Protocol (HTTP) request to a web server which receives the HTTP request and generates a response containing the requested web page, that is then returned to the web browser. As many services and/or applications execute, they access data sources, such as relational databases, to access and/or update data stored in the data sources. In the typical approach, the services and/or applications prepare a query for the data source, send the query to the data source, and wait for a response from the data source. The delay in receiving the response from the data source may often depend on how busy the data source is at the time of the query. Many queries include query elements that direct the data source to perform organizing, filtering, and/or other actions on the data that may also be performed collaboratively outside of the data source. By performing some of these query elements outside of the data source, it may be possible to reduce the overall time taken to process the query, depending on how busy the data source it.

Accordingly, it would be desirable to provide systems and methods to dynamically adapt the collaboration between data sources and other systems during the processing of queries as the load on the data sources changes.

SUMMARY

According to one example, a method of processing a data source query includes determining a load factor for a data source, receiving the data source query at a query assistant running on a computer server, determining a complexity of the data source query, adjusting the complexity by the load factor, simplifying the data source query by removing one or more first query elements from the data source query when the adjusted complexity is above a threshold, forming a query plan where the first query elements are designated for processing outside the data source, and performing the query plan by sending one or more abbreviated queries to the data source and processing the first query elements using the query assistant. The abbreviated queries are based on the data source query with the first query elements removed.

According to another example, a query assistant hosted in an application server includes a query manager, a load evaluator coupled to the query manager and configured to be coupled to a database using a database driver, and a federated query engine coupled to the query manager and configured to be coupled to the database using the database driver. The load evaluator is configured to determine a load factor of the database. The query manager is configured to receive a query from an application, determine a query complexity for the query, adjust the query complexity based on the load factor, and simplify the query by removing one or more first query elements from the query when the adjusted query complexity exceeds a threshold. The federated query engine is configured to form a query plan where the first query elements are designated for processing by the federated query engine and perform the query plan by sending one or more abbreviated queries to the database and processing the first query elements. The abbreviated queries are based on the query with the first query elements removed.

According to yet another example, a non-transitory machine-readable medium comprising a first plurality of machine-readable instructions which when executed by one or more processors associated with an application server are adapted to cause the one or more processors to perform a method. The method includes periodically determining a load factor for a data source, receiving a data source query, estimating a complexity of the data source query, adjusting the complexity by the load factor, iteratively removing one or more query elements from the data source query until there are no query elements that can be removed from the data source query or a second adjusted complexity of a simplified version of the data source query falls below a threshold, forming a query plan where the removed query elements are designated for processing outside the data source in a query engine, and performing the query plan by sending one or more abbreviated queries to the data source and processing the removed query elements in the query engine, the abbreviated queries being based on the data source query with the removed query elements removed.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
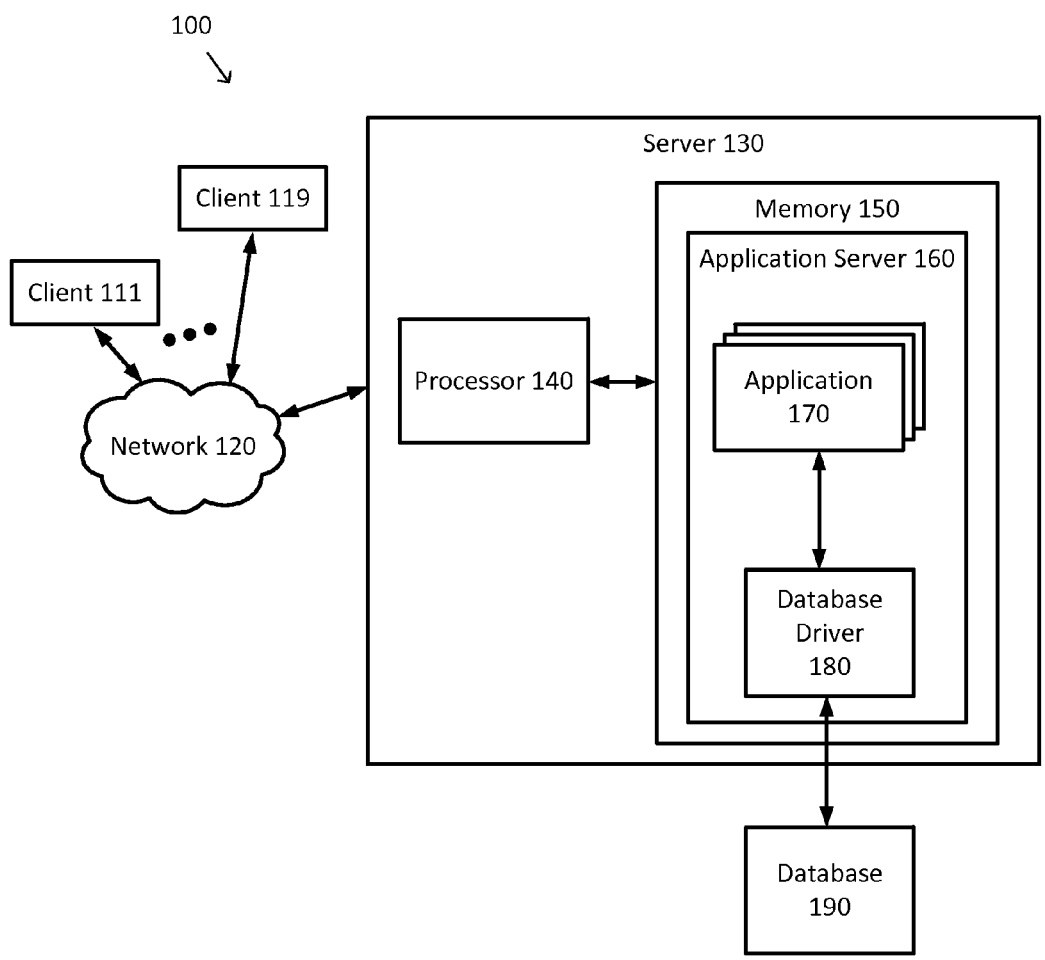
FIG. 1 is a simplified diagram of a service-oriented architecture (SOA) according to some examples.

FIG. 1 is a simplified diagram of a service-oriented architecture (SOA) 100 according to some examples. As shown in FIG. 1, SOA 100 is built around a client-service model. In SOA 100, service requests originate from one or more clients 111-119. Each of the clients 111-119 may make service requests through a network 120 to a server 130. Network 120 may be any kind of network including a local area network (LAN), such as an Ethernet, and/or a wide area network (WAN), such as the internet. In some examples, server 130 may be a standalone workstation, a cluster, a production server, within a virtual machine, and/or the like. Server 130 includes a processor 140 coupled to memory 150. In some examples, processor 140 may control operation and/or execution of hardware and/or software on server 130. Although only one processor 140 is shown, server 130 may include multiple processors, multi-core processors, field programmable gate arrays (FPGAs), application specific integrated circuits (ASICs), and/or the like. Memory 150 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 150 may be used to store an application server 160. Application server 160 includes one or more interfaces for receiving service requests from the one or more clients 111-119. Each of the service requests is then directed to at least one of the one or more services or applications 170 being hosted by application server 160. Numerous mechanisms for directing the service requests to the respective application 170 may be used including providing a uniform resource locator (URL) for the application in the respective service request, providing an application name of the application in the respective service request, and/or the like. The service requests may also be made using protocols such as remote procedure call, web services, and/or the like.

As each of the applications 170 handles its respective service requests, each application 170 is often called upon to access data in one or more databases. This typically includes identifying a database, forming a query to access the database, and forwarding the query to a database driver 180. Database driver 180 then accesses a corresponding database 190 where the query is handled. When processing of the query completes, a response is typically generated and returned to application 170 through database driver 180. In some examples, each application 170 may forward the query to database driver 180 using an application programming interface (API) call, and/or the like. In some examples, database driver 180 may be an open database connectivity (ODBC) driver, a java database connectivity (JDBC) driver, and/or the like. In some examples, data base 190 may be a relational database, a nosql database, and/or some other type of data source, such as a flat file, an eXtensible Markup Language (XML) file, a representational state transfer (REST) web service, a Simple Object Access Protocol (SOAP) web service, and/or the like. In some examples, the query may retrieve data from database 190 and/or write data to database 190.

As discussed above and further emphasized here, FIG. 1 is merely an example which should not unduly limit the scope of the claims. One of ordinary skill in the art would recognize many variations, alternatives, and modifications. In some examples, other architectures may be used with application server 160. In some examples, application server 160 may be hosted in one or more virtual machines and/or Java virtual machines running on server 130. In some examples, server 130 and/or memory 150 may also be used to host more than one application server. In some examples, application server 160 may include more than one database driver 180 for accessing additional databases 190 or data sources. In some examples, each of the databases 190 may be of different types. In some examples, one or more of the databases may be hosted in server 130, coupled to server 130 using connectors and/or cabling, and/or coupled to server 130 over a network, such as network 120.

The architecture and approach of FIG. 1 are generally limited in that the processing for the query is typically delegated to the database 190 by the applications 170. This means that when one of the applications 170 forms and sends a query to database 190, database 190 largely becomes responsible for the handling and processing of the query. Thus, as the processing load of database 190 increases (e.g., as a result of queries from other applications), the time used by database 190 to process the query typically increases as well. However, because many queries include query elements that direct the database to perform organizing, filtering, and/or other actions on data in the database that may also be performed by the application 170 or the application server 160, it may be possible to reduce the time used to process the query by collaboratively performing some portions of the query in the database and other portions in the application server. In some examples, this collaborative processing may also reduce the load on database 190 making the processing of other queries by database 190 less time consuming. In some examples, the effectiveness of this collaborative processing may also depend on the processing load of the database 190.

Figure 2:
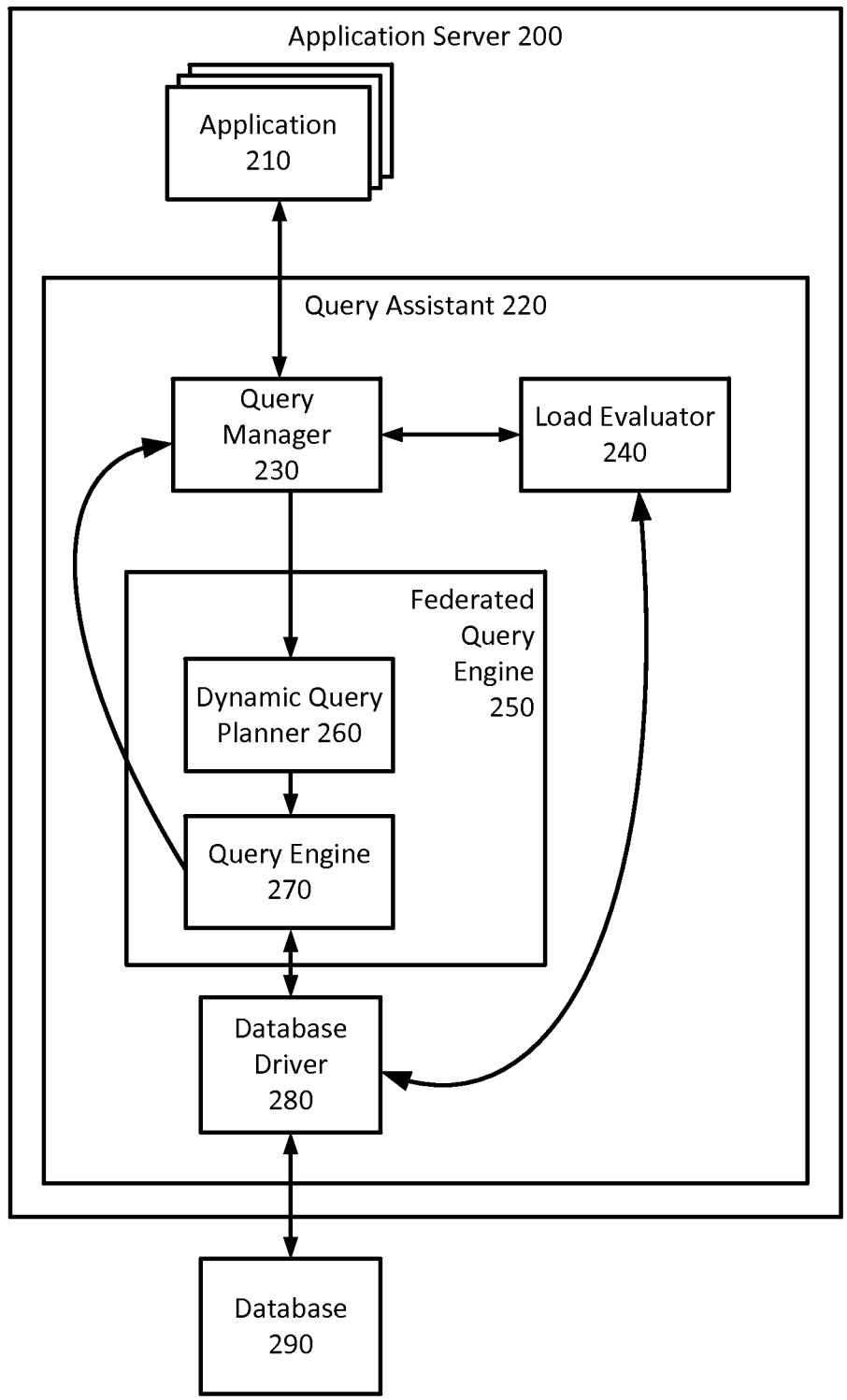
FIG. 2 is a simplified diagram of an application server supporting dynamic collaboration during database query processing according to some examples.

FIG. 2 is a simplified diagram of an application server 200 supporting dynamic collaboration during database query processing according to some examples. As shown in FIG. 2, application server 200 hosts one or more applications 210. In some examples, each of the applications 210 may be similar to the applications 170 except that they may be adapted for use with a query assistant 220. Rather than directing data source queries to a database using a typical database driver, each of the applications 210 directs queries to an interface of query assistant 220. In some examples, each application 170 may direct the queries to the interface of query assistant 220 using an API call, and/or the like. In some examples, the interface may be similar to an ODBC, a JDBC, and/or other database driver interfaces.

Upon receiving the query, query assistant 220 directs the query to a query manager 230. Query manager 230 examines the query to determine which query elements are used by the query. For example, several common query elements are associated with structured query language (SQL) key words such a UNION, GROUP BY, ORDER BY, JOIN, LIKE, BETWEEN, IN, and/or the like. Other common query elements are associated with operators such as comparison operators often used in WHERE and ON clauses and/or functions such as average, minimum, maximum, count, and/or the like. Based on the type and quantity of the query elements present in the query, query manager 230 determines a query complexity for the query. In some examples, the query complexity may be indicative of a cost to perform the query. In some examples, the query complexity may be determined using a weighted sum approach.

Query manager 230 may further adjust the query complexity to account for the current load on the relational database 290 requested by the application 210. To do this, query manager 230 uses a load evaluator 240. In some examples, load evaluator 240 may determine a load factor by sending one or more test queries to database 290 using a database driver 280. By analyzing the amount of time database 290 takes to respond to the test queries, load evaluator 240 may estimate the current responsiveness of database 290 to queries and from that determine a load factor. The load factor may then be used to adjust the query complexity so that the load on database 290 may be accounted for when query manager 230 makes decisions regarding the amount of query processing that it is handling and the amount of query processing database 290 is handling.

In some examples, the test queries may be sent periodically. In some examples, load evaluator 240 may aggregate the load factor results from multiple test queries using a weighted sum or other approach. In some examples, the weighted sum approach may include exponential smoothing. In some examples, the test queries may be sent at periodic intervals. In some examples, the periodic intervals may vary in length from one to ten minutes or longer. In some examples, the test queries may include combinations of queries of different complexity.

Query manager 230 may then begin an iterative process of selectively simplifying the query until the complexity of the simplified query, as adjusted by the load factor, falls below a threshold. In some examples, the threshold may be provided by an operator and/or other user of application server 200. During the iterative simplification process, query manager 230 selectively removes one or more query elements from the query. Each of the removed query elements is then designated for processing in query assistant 220 rather than for processing in database 290. As the query elements are removed from the query, the complexity of the query is determined again, with more query elements being removed from the simplified query until the adjusted query complexity falls below the threshold. In some examples, when a query element that is a join is removed from the query, this may result in two simplified queries that are each iteratively simplified until the aggregate adjusted query complexity of the two simplified queries falls below the threshold. In some examples, when the query includes multiple join query elements, more than two simplified queries may result.

Once the query has been sufficiently simplified, the query and the list of query elements designated for processing in query assistant 220 are passed to a federated query engine 250. In some examples, federated query engine 250 may be an extended version of a federated query engine such as the JBoss Teiid data virtualization engine from Red Hat, Inc., the Oracle Data Service Integrator (ODSI), or the InfoSphere Platform from IBM.

A typical federated query engine supports a uniform interface and a query language that may be used with any type of database or other data source. By providing a uniform interface and a uniform query language, the federated query engine allows the queries it receives to be processed cooperatively between the federated query engine and the database or data source. The federated query engine is able to do this by understanding the capabilities, specific query languages, and query mechanisms of each type of data source that is available to it. By knowing the capabilities of a data source, the federated query engine is able to determine a list of query elements that it processes and a list of query elements that the data source processes. Based on the division of query elements, the federated query engine then prepares a query plan that includes one or more abbreviated or simple queries to send to the data source and then a series of further processing that the federated query engine performs to complete the processing of the query. In the case of a typical federated query engine, the list of supported query elements is typically driven by the data source.

However, in the case of query assistant 220, federated query engine 250 includes a dynamic query planner 260 that is able to form the query plan based on not only the query and the capabilities of database 290, but also on the list of query elements supplied to it by query manager 220 that are to be collaboratively processed in federated query engine 250. Thus, dynamic query planner 260 removes from the query both the query features not supported by database 290 and the query features that are designated for processing in federated query engine 250 by query manager 230.

Once dynamic query planner 260 has formed the query plan, it is passed to a query engine 270 where the query is processed. This may include sending one or more abbreviated or simplified queries to database 290 and follow-up processing by query engine 270. Each of the simplified queries may be sent to database 290 using database driver 280. In some examples, database driver may be database driver 180, an ODBC driver, a JDBC driver, and/or the like. Once query engine 270 completes processing of the query plan, the result of the query is returned to query manager 230, which, in turn, returns the result to the application 210 that sent the query to query assistant 220.

As discussed above and further emphasized here, FIG. 2 is merely an example which should not unduly limit the scope of the claims. One of ordinary skill in the art would recognize many variations, alternatives, and modifications. In some examples, database 290 may be replaced by any suitable data source. In some examples, database 290 may be replaced by a nosql database, a flat file, an XML file, a REST web service, a SOAP web service, and/or the like. In some examples, query manager 230 may be aware of the type of the data source and simplify the query based on the capabilities of the data source prior to beginning the iterative query simplification process. Query manager 230 may add each of the query elements that the data source is not able to handle to the list of query elements that are to be collaboratively processed by federated query engine 250.

Figure 3:
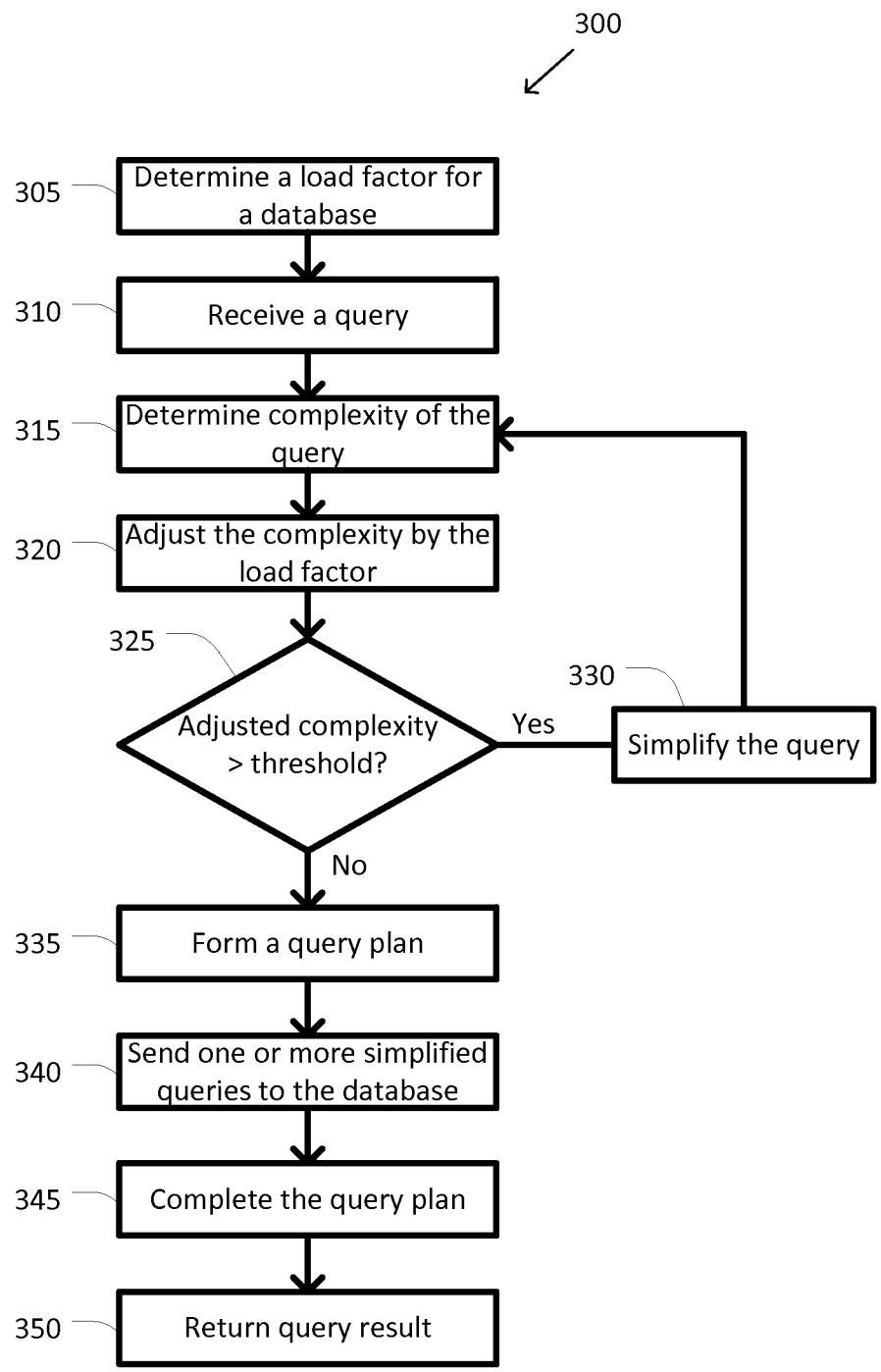
FIG. 3 is a simplified diagram of a method of query processing according to some examples

FIG. 3 is a simplified diagram of a method 300 of query processing according to some examples. In some examples, one or more of the processes 305-350 of method 300 may be implemented, at least in part, in the form of executable code stored on non-transient, tangible, machine readable media that when run by one or more processors (e.g., the processor 140 of server 130) may cause the one or more processors to perform one or more of the processes 305-350. In some examples, method 300 may be used by query assistant 220 to receive and process data source queries using database 290.

At a process 305, a load factor for a database is determined. In order to factor the current load on the database into the query processing of method 300, a load factor for the database is determined. The load factor is an estimate of how long the database may currently take to process a query relative to a nominal query processing time when the database is subject to little or no load. In some examples, the load factor may be based on response times of the database to one or more test queries. In some examples, the response times may help quantify database load and/or latency as well as loads and/or latencies of other associated resources, such as networks and/or storage devices.

Figure 4:
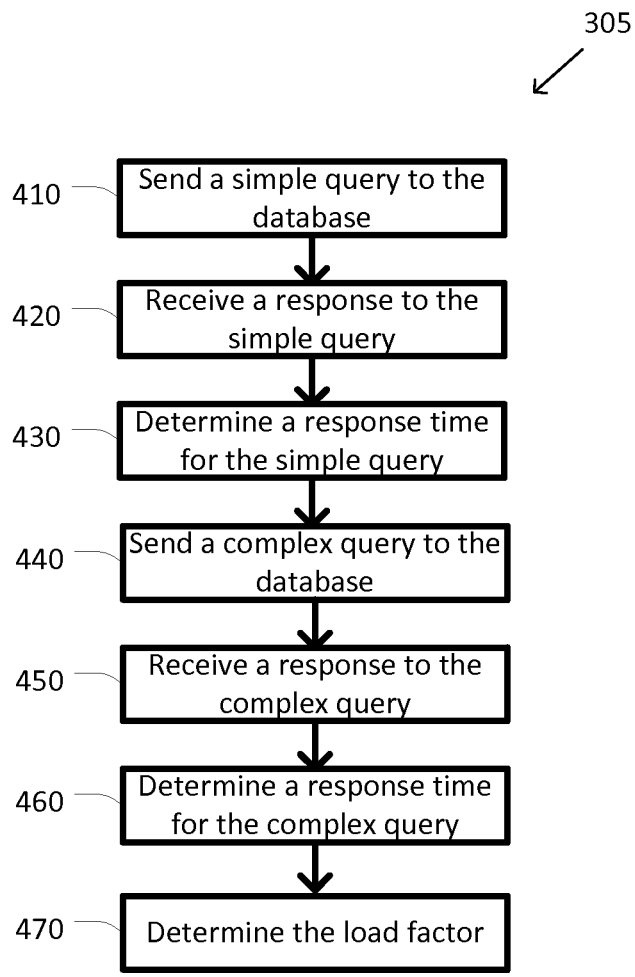
FIG. 4 is a simplified diagram of the process for determining a load factor of a database according to some examples.

FIG. 4 is a simplified diagram of the process 305 for determining a load factor of a database according to some examples. In some examples, process 305 may be used by load evaluator 240 to determine the load factor.

At a process 410, a simple query is sent to the database. The simple query may be used to estimate the basic response time or latency of the database, including any other intervening systems such as a network. As such, the simple query is designed to impose little processing on the database other than receiving the query, parsing the query, and returning a result. Thus, the simple query avoids accessing database tables. In some examples, the simple query may be "SELECT 1". In some examples, a timestamp corresponding to when the simple query is sent is recorded. In some examples, the simple query may be sent to the database using one or more API calls in a database driver, such as database driver 280.

At a process 420, a response to the simple query is received. After the database processes the simple query sent to it during process 410, a response is returned. In some examples, when the response to the simple query is received, a timestamp is recorded.

At a process 430, a response time for the simple query is determined. Based on the amount of time that elapses between when the simple query is sent during process 410 and the response is received during process 420, the response time or latency for the simple query is determined. In some examples, the response time for the simple query may be determined by subtracting the timestamp recorded during process 410 from the timestamp recorded during process 420.

At a process 440, a complex query is sent to the database. The complex query may be used to estimate the response time or latency of the database, including any other intervening systems such as a network, for a query that also requires the database to access at least one data table. As such, the complex query is designed to impose processing by the database that includes the processing of the simple query as well as any additional processing time or costs associated with accessing a data table and the storage device in which the data table is stored. In some examples, the complex query may be "SELECT*FROM test_table". In some examples, a timestamp corresponding to when the complex query is sent is recorded. In some examples, the complex query may be sent to the database using one or more API calls in the database driver.

At a process 450, a response to the complex query is received. After the database processes the complex query sent to it during process 440, a response is returned. In some examples, when the response to the complex query is received, a timestamp is recorded.

At a process 460, a response time for the complex query is determined. Based on the amount of time that elapses between when the complex query is sent during process 440 and the response is received during process 450, the response time or latency for the complex query is determined. In some examples, the response time for the complex query may be determined by subtracting the timestamp recorded during process 440 from the timestamp recorded during process 450.

At a process 470, the load factor is determined. The response time for the simple query determined during process 430 and the response time for the complex query determined during process 460 are combined together to determine the load factor. In general, the load factor should consider the current response times of the database relative to nominal response times. In some examples, Equation 1 may be used to determine the load factor.

$$\text{load\_factor} = \frac{\text{complex\_latency} - \text{simple\_latency} + \text{baseline\_simple\_latency}}{\text{baseline\_complex\_latency}} \quad (1)$$

In some examples, the baseline simple latency may be based on a response time of the database to the simple query when the database is subject to little or no loading. In some examples, the baseline simple latency may provide a configurable offset in the load factor that may vary in value between 0.0 and 100 ms or longer. In some examples, the baseline complex latency may be based on a response time of the database to the complex query when the database is subject to little or no loading. In some examples, the baseline simple latency and/or the baseline complex latency may set by an operator and/or a user of the query assistant and the load balancer.

As discussed above and further emphasized here, FIG. 4 is merely an example which should not unduly limit the scope of the claims. One of ordinary skill in the art would recognize many variations, alternatives, and modifications. In some examples, the simple query and processes 410-430 may be omitted with the load factor being alternatively determined based on Equation 2.

$$\text{load\_factor} = \frac{\text{complex\_latency}}{\text{baseline\_complex\_latency}} \quad (2)$$

Referring back to FIG. 3, process 305 may be performed periodically. In some examples, the test queries may be sent at the start of a current interval with the load factor being determined and used until the end of the current interval. In some examples, the periodic intervals may vary in length from one to ten minutes or longer. In some examples, the load factor may be aggregated over one or more intervals. In some examples, the aggregation may include computing a weighted sum and/or applying exponential smoothing.

At a process 310, a query is received. The query may be received by the query assistant from a service and/or an application. For example, the service and/or the application may use an API call or similar mechanism to send the query to the query assistant. In some examples, the API may be similar to an ODBC, a JDBC, and/or other database driver APIs.

At a process 315, complexity of the query is determined. The query assistant examines the query to provide an estimated complexity and/or cost of the query. Initially the query being examined is the query received during process 305, but different versions of the query may be examined each time process 315 is performed. In some examples, the query manager examines the query to determine which query elements are included in the query. For example, several common query elements are associated with structured query language (SQL) key words such a UNION, GROUP BY, ORDER BY, JOIN, LIKE, BETWEEN, IN, and/or the like. Other common query elements are associated with operators such as comparison operators often used in WHERE and ON clauses and/or functions such as average, minimum, maximum, count, and/or the like.

Figure 5:
FIG. 5 is a simplified diagram of query elements and their cost according to some examples.

FIG. 5 is a simplified diagram of query elements and their cost according to some examples. As shown in FIG. 5, several query elements that are included in most SQL query languages are shown. Each is assigned an ID number and is associated with a cost. For example, queries containing a UNION clause include the union query element, which is assigned an ID of 1 and a cost of 1.2. Similarly, queries that include a BETWEEN clause, such as in a WHERE clause, include a between query element, which is assigned an ID of 12 and a cost of 1.3. In general, the associated costs in FIG. 5 are designed to represent the relative computation cost of the respective query elements. In some examples, the query elements and their respective costs in FIG. 5 are representative only and other query elements and/or other cost values for the shown query elements may be used.

Referring back to FIG. 3 and process 315, based on the type and quantity of the query elements present in the query, the query manager determines the query complexity for the query. In some examples, the query complexity may be determined using a weighted sum approach as shown in Equation 3, where each of the $X_i$ values correspond to the costs in FIG. 5 for each ID i. In some examples, Equation 3 is representative only and other weighted sums and/or combinations of query elements may be used to determine query complexity. In some examples, when simplification of the query results in splitting the query into two or more simplified queries, such as when a join query element is removed, Equation 3 may be applied to each of the simplified queries to determine a respective query complexity for each simplified query. The respective query complexities may then be aggregated, such as by a weighted sum, to determine the overall query complexity.

$$\begin{aligned}query\_complexity = &\#\_of\_tables + \#\_of\_UNION*X_1 + \\ &\#\_of\_GROUP\_BY*X_2 + \#\_of\_ORDER\_BY*X_3 + \\ &\#\_of\_INNER\_JOIN*X_4 + \\ &\#\_of\_RIGHT\_JOIN*X_5 + \#\_of\_LEFT\_JOIN*X_6 + \\ &\#\_of\_FULL\_JOIN*X_7 + \#\_of\ functions \\ &called*X_8 + \#\_of\ predicates\ after\ WHERE\ or \\ &HAVING\ with\ inequalitiess*X_9 + \#\_of\ predicates \\ &after\ WHERE\ or\ HAVING\ with\ equals*X_{10} + \#\_of \\ &predicates\ after\ WHERE\ or\ HAVING\ with \\ &LIKE*X_{11} + \#\_of\ predicates\ after\ WHERE\ or \\ &HAVING\ with\ BETWEEN*X_{12} + \#\_of\ predicates \\ &after\ WHERE\ or\ HAVING\ with\ IN*X_{13} + \#\_of \\ &WHEN\ clauses\ in\ each\ CASE\end{aligned} \quad (3)$$

At a process 320, the query complexity is adjusted by the load factor. The query complexity determined during process 315 is adjusted to account for the current load of the database by using the load factor determined during process 310. In some examples, because the load factor may be related to the ratio of a current response time for a complex query relative to a nominal or baseline response time for the complex query, the query complexity may be multiplied by the load factor to determine the adjusted query complexity.

At a process 325, it is determined whether the adjusted query complexity is above a threshold. In some examples, the threshold may be set by an operator and/or a user of the query assistant to control how likely it will be that the query assistant may trigger collaborative processing of the query received during process 305. In some examples, the threshold may vary in value between 1 and 20 or more. When the adjusted query complexity is above or exceeds the threshold this indicates that more collaborative processing of the query is to occur beginning with simplification of the query using a process 330. When the adjusted query complexity is below the threshold, the collaboration level between the database and the query assistant is determined and the query is performed beginning with a process 335. In some examples, when it is not possible to further simplify the query, the query may be performed beginning with process 335 even though the complexity of the simplified query is still above the threshold.

At the process 330, the query is simplified. When the adjusted query complexity is above the threshold, this means that additional collaborative processing of the query is desired. The collaborative processing is increased by simplifying the query by removing one or more query elements from the query. Each of the query elements that is removed are designated to be performed by the query assistant rather than by the database. As more query elements are removed, more of the query processing is collaboratively performed by the query assistant using a federated query engine. Each time the query is simplified, its complexity may be re-determined using process 315.

Figure 6:
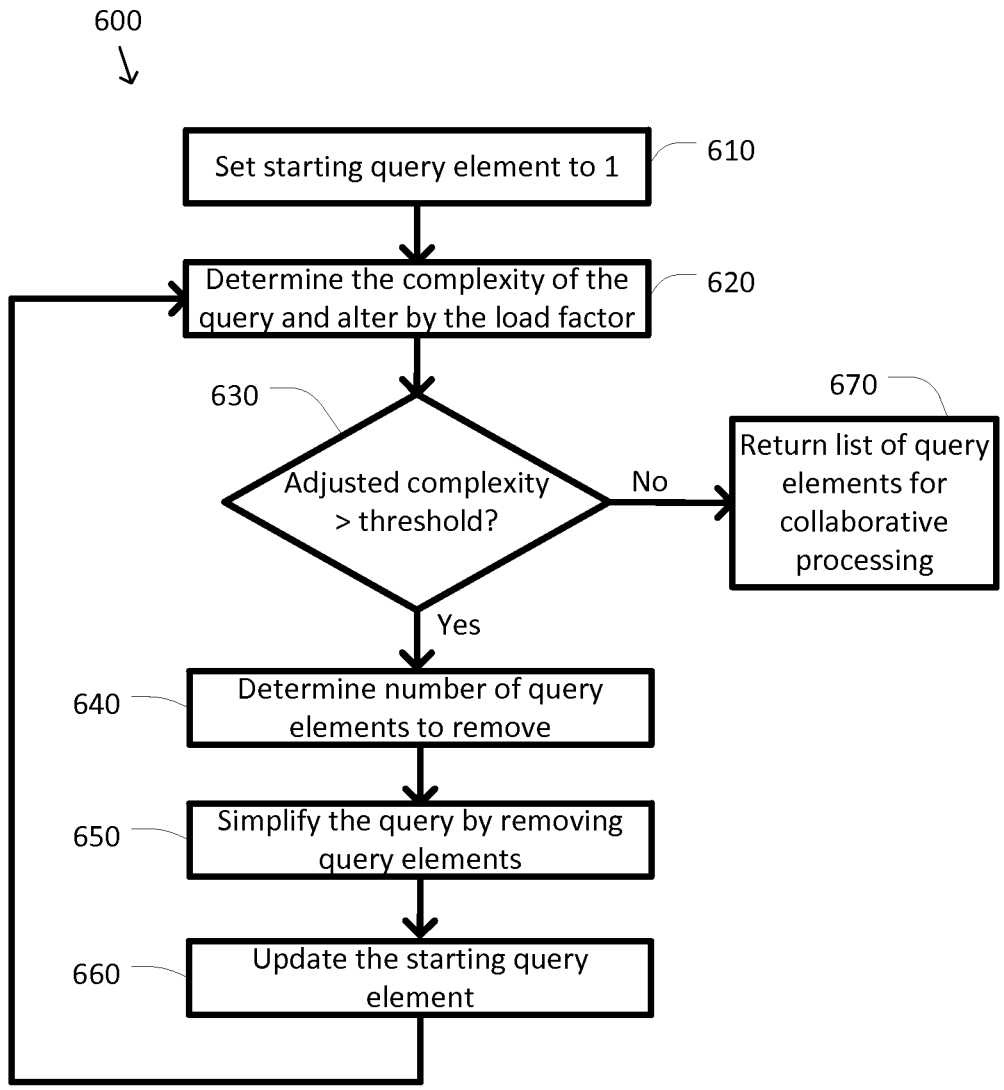
FIG. 6 is a simplified diagram of a method of iterative query simplification according to some examples.

FIG. 6 is a simplified diagram of a method 600 of iterative query simplification according to some examples. In some examples, one or more of the processes 610-670 of method 600 may be implemented, at least in part, in the form of executable code stored on non-transient, tangible, machine readable media that when run by one or more processors (e.g., the processor 140 of server 130) may cause the one or more processors to perform one or more of the processes 610-670. In some examples, method 600 may be used by query assistant 220 to iteratively remove query elements from a query until a complexity of the query falls below a threshold. In some examples, method 600 performs processes 315, 320, 325, and 330 of method 300. In some examples, method 600 may be used to remove query elements using the query elements as ordered in FIG. 5 using the query element ID with the union query element representing the first query element to remove and the in query element representing the last query element to remove.

At a process 610, a starting query element is set to one. Because query elements are to be removed from the query based on an ordered or numbered list of query elements, the starting query element is set to one to begin at the start of the list. When the query element list is based on FIG. 5, the starting query element is set to an ID of one, which corresponds to the union query element.

At a process 620, the complexity of the query is determined and then altered by the load factor. The query is examined to determine which query elements are included in the query. Query elements, including the query elements in the numbered list of query elements, are identified and counted. Based on the query elements and their counts, the query complexity is determined using a weighted sum based on the relative cost assigned to each of the query elements. For example, when the list of query elements from FIG. 5 is used, Equation 3 may be used to determine the query complexity. The query complexity is then altered by the load factor determined, for example, during process 305. In some examples, the query complexity is multiplied by the load factor.

At a process 630, it is determined whether the adjusted query complexity is above a threshold. In some examples, process 630 may be substantially similar to process 325. When the adjusted query complexity is above the threshold this indicates that more collaborative processing of the query is to occur and the query is simplified beginning with a process 640. When the adjusted query complexity is below the threshold, a suitable collaboration level between the database and the query assistant is determined and a list of query elements designated for collaborative processing is returned using a process 670. In some examples, when it is not possible to further simplify the query because the starting query element is higher than the number of query elements in the numbered list of query elements, the list of query elements designated for collaborative processing, which includes each of the query elements in the numbered list of query elements, is returned using process 670.

At the process 640, the number of query elements to remove is determined. Rather than remove query elements one by one from the query based on the numbered list of query elements, query elements are removed based on how much the adjusted query complexity is above the threshold. Thus, when the adjusted query complexity is significantly above the threshold, there is a higher likelihood that two or more query elements may be removed from the query. In some examples, Equation 4 may be used to determine how many query elements to remove from the query during this simplification iteration. Equation 4 rounds up the number of query elements to remove to the nearest whole number. Equation 4 further includes an aggression factor, af, that may be used to control how aggressively query elements are removed. A larger aggression factor results in a larger number of query elements being removed during each simplification iteration. In some examples, the aggression factor may be set by an operator and/or user of the query assistant. In some examples, the aggression factor may vary from 0.1 to 2.0 or larger.

$$\#\_to\_remove=round\_up[(altered\_query\_complexity-threshold)*af] \quad (4)$$

At a process 650, the query is simplified by removing query elements. The query elements to remove are determined by the starting query element, the number of query elements to remove, and the numbered list of query elements. For example, when the starting query element is one and the number of query elements to remove is three, the query elements numbered one, two, and three are removed from the query. As another example, when the starting query element is five and the number of query elements to remove is two, the query elements numbered five and six are removed from the query. Those determined query elements that are included in the query are removed and any of the determined query elements that are not included in the query are ignored during process 650.

In some examples, when one of the query elements that is removed is a join query element (e.g., query elements with IDs of four, five, six, and seven from FIG. 5), removal of the join element may result in splitting the query into two simplified queries. Each of the two simplified queries represents a separate query that may be used to access a different table in the database. When the query ends up splitting, method 600 continues with multiple simplified queries. Each of the multiple simplified queries is then used in future determinations of altered query complexity during process 620 and query simplification during process 650. For example, the remaining query elements in each of the simplified queries are included during determination of query complexity and the query elements are removed from each of the simplified queries. When the query includes more than one join, the number of simplified queries increases with each join that is removed.

At a process 660, the starting query element is updated. The starting query element is updated to identify the next query element on the numbered list of query elements that is a candidate for removal. In some examples, the starting query element is updated by adding to it the number of query elements to remove determined during process 640. Once the starting query element is updated, the simplification returns to process 620 to begin another simplification iteration.

At the process 670, a list of query elements for collaborative processing is returned. Once the query is suitably simplified, each of the query elements from the numbered list of query elements that has been identified for removal during process 650 is included in the list of query elements for collaborative processing. In some examples, the starting query element may be used to determine the list of query elements for processing. Each of the query elements on the numbered list of query elements from one to one less than the starting query element are placed on the list of query elements for collaborative processing. For example, when the starting query element is seven, the query elements with IDs from one to six are included in the list of query elements for collaborative processing. In some examples, when the original query has an adjusted query complexity that is below the threshold (i.e., the starting query element is one), the list of query elements for collaborative processing is empty. The list of query elements for collaborative processing is then returned for use by the federated query engine in forming a query plan.

As discussed above and further emphasized here, FIG. 6 is merely an example which should not unduly limit the scope of the claims. One of ordinary skill in the art would recognize many variations, alternatives, and modifications. In some examples, when no query elements are removed from the query during process 650 because none of the query elements determined by the starting query element and the number of query elements to remove are included in the query, the starting query element may be updated by the number of query elements to remove (see process 660) and process 650 may be repeated without first re-determining the altered query complexity. In some examples, process 650 may continue to repeat until query elements are removed from the query, or the numbered list of query elements is exhausted.

Referring back to FIG. 3, at the process 335, a query plan is formed. Once the query is simplified to the point where the adjusted query complexity is below the threshold, the query and the list of query elements designated for collaborative processing are passed by the query assistant to a federated query engine, such as federated query engine 250. Using a dynamic query planner, such as dynamic query planner 260, the federated query engine forms a query plan that includes one or more simplified queries and/or additional query processing steps to be performed in the federated query engine. The simplified queries are to be sent to and handled by the database. The additional query processing steps correspond to the query elements that are designated for collaborative processing as well as any query elements that are not supported by the database. In some examples, the query plan is generally represented in tree form with each node in the tree representing a query processing operation to be performed by either the database or the federated query engine.

At a process 340, one or more simplified queries are sent to the database. The federated query engine uses its query engine (e.g., query engine 270) to perform the query plan formed during process 335. As part of performing the query plan, the query engine sends each of the one or more simplified or abbreviated queries in the query plan to the database for processing. The results from each of the one or more simplified queries are then returned to the query engine. In some examples, each of the simplified queries may be sent to the database using a database driver. In some examples, database driver may be database driver 180 and/or 280, an ODBC driver, a JDBC driver, and/or the like.

At a process 345, the query plan is completed. To complete the query plan, the query engine performs the additional query processing steps. This includes processing any of the query elements that were designated for collaborative processing by the query assistant. In some examples, the query engine may also perform any query elements for which the database does not include the capabilities to handle.

As an example of processes 335, 340, and 345, consider the query "SELECT u.name, a.city FROM users AS u JOIN addresses AS a ON u.id=a.user_id WHERE a.state='France' ORDER BY u.name" where the query simplification of processes 315, 320, 325, and 330 determined that the ORDER BY clause/query element is designated for collaborative processing by the federated query engine. When the query plan is formed during process 335, the ORDER BY clause is removed from the query to form a simplified query. The simplified query is sent to the database during process 340 and the result of the simplified query is returned to the federated query engine. The federated query engine then performs the sorting of the ORDER BY clause during process 345, thus completing the query plan.

At a process 350, a query result is returned. The result of the query plan processed during processes 340 and/or 345 is returned to the service and/or the application that provided the query received during process 310. In some examples, the federated query engine returns the query results to the query manager, which in turn returns the query results to the application that made the query. In some examples, when the query is provided to the query assistant using a call to an API function, the results may be returned as the return value for the API function.

As discussed above and further emphasized here, FIG. 3 is merely an example which should not unduly limit the scope of the claims. One of ordinary skill in the art would recognize many variations, alternatives, and modifications. In some examples, the database may be replaced by any suitable data source. In some examples, the database may be replaced by a nosql database, a flat file, an XML file, a REST web service, a SOAP web service, and/or the like. In some examples, the query manager may be aware of the type of the data source and simplify the query based on the capabilities of the data source prior to beginning the iterative query simplification process of processes 315, 320, 325, and 330. The query manager may add each of the query elements that the data source is not able to handle to the list of query elements that are to be collaboratively processed by the federated query engine.

Some examples of server 130, application servers 160 and/or 200, and/or query assistant 220 may include non-transient, tangible, machine readable media that include executable code that when run by one or more processors (e.g., processor 140) may cause the one or more processors to perform the processes of methods 300 and/or 600 as described above. Some common forms of machine readable media that may include the processes of methods 300 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of processing a data source query, the method comprising:
   determining, by one or more processors of a computer server, a load factor for a data source;
   receiving the data source query at a query assistant being executed by the one or more processors;
   calculating, by the one or more processors, a complexity of the data source query;
   adjusting, by the one or more processors, the calculated complexity by the load factor;
   simplifying, by the one or more processors, the data source query by removing one or more first query elements from the data source query to form one or more abbreviated queries in response to determining that the adjusted complexity is above a threshold;
   forming, by the one or more processors, a query plan where the first query elements are designated for processing outside the data source; and
   performing, by the one or more processors, the query plan by sending the one or more abbreviated queries to the data source and processing the first query elements outside the data source.

2. The method of claim 1 wherein determining the load factor comprises sending one or more test queries to the data source.

3. The method of claim 2 wherein the test queries include a first query that does not access a data table and a second query that accesses a data table.

4. The method of claim 2 wherein the load factor is based on one or more first latencies based on response times of the data source to the test queries and one or more second latencies based on nominal response times of the data source to the test queries.

5. The method of claim 1 wherein calculating the complexity comprises:
   counting a number of each of various types of query elements in the data source query; and
   computing a weighted sum based on the counting and respective costs of each of the various types of query elements.

6. The method of claim 1 wherein adjusting the calculated complexity by the load factor comprises multiplying the calculated complexity by the load factor.

7. The method of claim 1 wherein processing the first query elements outside the data source comprises processing the first query elements using a federated query engine.

8. The method of claim 1 wherein simplifying the data source query comprises iteratively removing one or more second query elements from the data source query until there are no query elements that can be removed or a second adjusted complexity of the one or more abbreviated queries falls below the threshold.

9. The method of claim 8 wherein a number of second query elements to remove during each iteration is based on an aggression factor and a difference between the second adjusted query complexity and the threshold.

10. The method of claim 1 wherein simplifying the data source query comprises selecting the first query elements based on an ordered list of query elements.

11. The method of claim 1 wherein performing the query plan further comprises processing second query elements not supported by the data source using a federated query engine.

12. The method of claim 1 wherein the data source is selected from a group consisting of a relational database, a nosql database, a flat file, an XML file, a REST web service, and a SOAP web service.

13. A computer server comprising:
   memory; and
   one or more processors coupled to the memory;
   wherein the one or more processors execute machine-readable instructions stored in the memory to implement a query assistant comprising:
      a query manager;
      a load evaluator coupled to the query manager and configured to be coupled to a database using a database driver; and
      a federated query engine coupled to the query manager and configured to be coupled to the database using the database driver;
   wherein:
      the load evaluator is configured to determine a load factor of the database;
      the query manager is configured to:
         receive a query from an application;
         calculate a query complexity for the query;
         adjust the calculated query complexity based on the load factor; and
         simplify the query by removing one or more first query elements from the query to form one or more abbreviated queries in response to determining that the adjusted query complexity exceeds a threshold;
      the federated query engine is configured to:
         form a query plan where the first query elements are designated for processing by the federated query engine; and
         perform the query plan by sending the one or more abbreviated queries to the database and processing the first query elements.

14. The computer server of claim 13 wherein the load evaluator is further configured to:
   send one or more test queries to the database; and
   determine the load factor based on one or more first latencies based on response times of the database to the test queries and one or more second latencies based on nominal response times of the database to the test queries.

15. The computer server of claim 13 wherein the query manager is further configured to:
   count a number of each of various types of query elements in the query; and
   compute a weighted sum based on the counted numbers and respective weights assigned to each of the various types of query elements.

16. The computer server of claim 13 wherein the federated query engine is further configured to iteratively remove one or more second query elements from the query until there are no query elements that can be removed or a second adjusted complexity of the one or more abbreviated queries does not exceed the threshold.

17. The computer server of claim 13 wherein the query manager is further configured to select the first query elements based on an ordered list of query elements.

18. A non-transitory machine-readable medium comprising a first plurality of machine-readable instructions which when executed by one or more processors associated with an application server are adapted to cause the one or more processors to perform a method comprising:
   periodically determining a load factor for a data source;
   receiving a data source query;
   estimating a complexity of the data source query;
   adjusting the estimated complexity by the load factor;
   in response to determining that the adjusted complexity is above a threshold, iteratively removing one or more query elements from the data source query to form one or more abbreviated queries until there are no query elements that can be removed from the data source query or a second adjusted complexity of the one or more abbreviated queries falls below the threshold;
   forming a query plan where the removed query elements are designated for processing outside the data source in a query engine; and
   performing the query plan by sending the one or more abbreviated queries to the data source and processing the removed query elements in the query engine.

19. The non-transitory machine-readable medium of claim 18 wherein:
   determining the load factor comprises sending one or more test queries to the data source; and
   the load factor is based on response times of the data source to the test queries and nominal response times of the data source to the test queries.

20. The non-transitory machine-readable medium of claim 18 wherein estimating the complexity comprises:
   counting a number of each of various types of query elements in the data source query; and
   computing a weighted sum based on the counting and respective costs of each of the various types of query elements.

* * * * *